US012780633B2

(12) United States Patent
Xu et al.

(10) Patent No.: US 12,780,633 B2
(45) Date of Patent: Nov. 3, 2026

(54) WALKING TYPE AERIAL WORK PLATFORM

(71) Applicant: ZHEJIANG DINGLI MACHINERY CO., LTD, Huzhou (CN)

(72) Inventors: Shugen Xu, Huzhou (CN); Zhong Xu, Huzhou (CN)

(73) Assignee: ZHEJIANG DINGLI MACHINERY CO., LTD, Huzhou (CN)

( * ) Notice: Subject to any disclaimer, the term of this patent is extended or adjusted under 35 U.S.C. 154(b) by 404 days.

(21) Appl. No.: 18/518,484

(22) Filed: Nov. 23, 2023

(65) Prior Publication Data

US 2024/0083726 A1 Mar. 14, 2024

(30) Foreign Application Priority Data

Oct. 23, 2023 (CN) ........................ 202311373928.X

(51) Int. Cl.
*B66F 11/04* (2006.01)

(52) U.S. Cl.
CPC .................................. *B66F 11/044* (2013.01)

(58) Field of Classification Search
CPC ....... B66F 11/044; B66F 11/04; B66F 11/046; B66F 11/042
See application file for complete search history.

(56) References Cited

U.S. PATENT DOCUMENTS 4,271,926 A * 6/1981 Cullity .................. B66F 11/046 182/2.11
4,326,601 A * 4/1982 Grove ................... B66F 17/006 182/2.11
4,359,137 A * 11/1982 Merz ..................... B66F 11/046 182/2.11
4,553,632 A * 11/1985 Griffiths ................ B66F 11/044 182/2.4
4,690,246 A * 9/1987 Hornagold ............ B66F 11/046 182/19
4,775,029 A * 10/1988 MacDonald .......... B66F 11/046 52/117
5,107,955 A * 4/1992 Kishi .................... B66F 11/046 182/2.1
10,961,099 B2 * 3/2021 Clark ..................... G01G 19/52

(Continued)

FOREIGN PATENT DOCUMENTS

WO WO-2018185607 A1 * 10/2018 ............ B66F 11/042

*Primary Examiner* — Kristen C Hayes

(74) *Attorney, Agent, or Firm* — Hemisphere Law, PLLC

(57) ABSTRACT

The present disclosure relates to the field of aerial work, and in particular, to a walking type aerial work platform, including a walking base, wherein the walking base is provided with a turntable; a mast type lifting device is fixed on the turntable; the mast type lifting device is hinged with one end of a retractable large supporting arm; the other end of the large supporting arm is connected with a work platform through a connecting structure; an up-and-down amplitude changing mechanism is arranged between the large supporting arm and the mast type lifting device; and a leveling mechanism is arranged among the mast type lifting device, the large supporting arm, and the connecting structure. The walking type aerial work platform can transport a work platform to an operation point even if there is an obstacle, and can always maintain the work platform in a horizontal state.

9 Claims, 11 Drawing Sheets

(56) References Cited

U.S. PATENT DOCUMENTS

| | | | | |
|---|---|---|---|---|
| 2004/0262078 | A1* | 12/2004 | Bailey | B66F 17/006 182/2.1 |
| 2009/0218173 | A1* | 9/2009 | Beeson | B66F 11/046 187/234 |
| 2010/0294592 | A1 | 11/2010 | Crook et al. | |
| 2012/0211301 | A1* | 8/2012 | Clark | B66F 17/006 182/2.2 |
| 2017/0349420 | A1* | 12/2017 | Pithoud | B66F 11/044 |
| 2018/0162708 | A1 | 6/2018 | Pithoud | |
| 2019/0315612 | A1 | 10/2019 | Poltronieri | |
| 2022/0198905 | A1* | 6/2022 | Brulo | G01C 3/04 |
| 2022/0371870 | A1* | 11/2022 | Mellerin | B66F 11/044 |

* cited by examiner

WALKING TYPE AERIAL WORK PLATFORM

TECHNICAL FIELD

The present disclosure relates to the field of aerial work, and in particular, to a walking type aerial work platform.

BACKGROUND

An aerial work platform is a mobile aerial work product that serves various industries such as aerial work, equipment mounting, and maintenance. For example, a patent No. CN201410465457.X discloses an aerial work platform that can achieve walking, lifting, and up-and-down amplitude changing. However, the patent also has the following drawbacks: 1) When there is an obstacle in a horizontal direction, the aerial work platform often cannot transport a work platform on it to an operation point. 2) During operation of the aerial work platform, the work platform is often affected and cannot always maintain a horizontal state. 3) The work platform in the aerial work platform is directly hinged with a first connecting arm and a second connecting arm. Even if a weighing sensor is mounted, the work platform cannot be precisely weighed. Precise weighing of the work platform is essential for ensuring the safety of workers.

SUMMARY

(I) Technical Problem to be Solved

For the shortcomings in the prior art, the present disclosure aims to provide a walking type aerial work platform, which solves the problems in the prior art. The walking type aerial work platform can also transport a work platform to an operation point even if there is an obstacle, can always keep the work platform in a horizontal state, and can precisely monitor a load of the work platform in the whole process to ensure the safety of an operator.

(I) Technical Solutions

In order to achieve the above objective, the present disclosure provides the following technical solutions: A walking type aerial work platform includes a walking base, wherein the walking base is provided with a turntable; a mast type lifting device is fixed on the turntable; the mast type lifting device is hinged with one end of a retractable large supporting arm; the other end of the large supporting arm is connected with a work platform through a connecting structure; an up-and-down amplitude changing mechanism is arranged between the large supporting arm and the mast type lifting device; and a leveling mechanism is arranged among the mast type lifting device, the large supporting arm, and the connecting structure.

Preferably, the connecting structure includes two first connecting plates symmetrically arranged; outer sides of front ends of the two first connecting plates are connected with second connecting plates through a first connecting shaft; the second connecting plates are provided with transverse waist holes through which the first connecting shaft passes; the first connecting plates are provided with first circular holes through which the first connecting shaft passes; front end portions of the two second connecting plates are fixed with a third connecting plate; and the work platform is fixed on the third connecting plate.

Preferably, several second connecting shafts are also arranged between the two second connecting plates; shaft sleeves through which the second connecting shafts pass are fixed on the first connecting plates; vertical waist holes are formed in the shaft sleeves; and the second connecting plates are provided with second circular holes through which the second connecting shafts pass.

Preferably, the up-and-down amplitude changing mechanism includes two first fixed plates fixed on front and rear sides close to a lower end of the large supporting arm; one end of a first oil cylinder is hinged between the two first fixed plates; and the other end of the first oil cylinder is hinged to the mast type lifting device.

Preferably, the leveling mechanism includes a second oil cylinder and a third oil cylinder; the second oil cylinder and the third oil cylinder are communicated with each other, wherein one end of the second oil cylinder is hinged to the mast type lifting device, and the other end of the second oil cylinder is hinged to two second fixed plates; the two second fixed plates are respectively fixed on front and rear sides of the large supporting arm; one end of the third oil cylinder is hinged to an upper end of the connecting structure; and the other end of the third oil cylinder is hinged to a bottom end of the large supporting arm.

Preferably, two end portions of the first connecting shaft extend out of the second connecting plates; the two end portions of the first connecting shaft are fixedly connected to the third connecting plate through L-shaped plates; and a weighing sensor is arranged at one of the end portions of the first connecting shaft.

Preferably, two end portions of the second connecting shafts extend out of the second connecting plates; the two end portions of the second connecting shafts are sleeved with annular sleeves; one end of each annular sleeve is fixedly connected to the second connecting plate; and the annular sleeves and the second connecting shafts are fixed together through screws and nuts.

Preferably, edges of the first circular holes are outwards provided with first grooves; first magnetic blocks are fixed at lower ends of the first grooves; second magnetic blocks are fixed at positions, opposite to the first magnetic blocks, on the first connecting shaft; the first magnetic blocks and the second magnetic blocks are mutually repulsive; third magnetic blocks are fixed at upper ends of the first grooves; fourth magnetic blocks are fixed at positions, opposite to the third magnetic blocks, on the first connecting shaft; and the third magnetic blocks and the fourth magnetic blocks are mutually attractive.

Preferably, upper and lower edges of the transverse waist holes are outwards provided with second grooves; movable plates are arranged in the second grooves; semicircular slots are arranged at inner ends of the movable plates; the movable plates are slidably connected to the second grooves; and several springs are connected between bottom surfaces of the second grooves and the movable plates.

Preferably, a pit plate structure is arranged at a bottom of the walking base.

(III) Beneficial Effects

1. According to the present disclosure, through the arrangement of the retractable large supporting arm and the up-and-down amplitude changing mechanism, when there is an obstacle, the walking type aerial work platform can also transport a work platform to an operation point even if the walking base is not too close to the operation point; transverse and longitudinal distances can be flexibly adjusted; in an adjustment process of the up-and-down amplitude changing mechanism, the work platform will tilt. In this case, the work platform is kept in the horizontal state through the leveling mechanism, thus ensuring the safety of an operator. The connecting structure can precisely monitor the load of the work platform, which also ensures the stability of fixing of the work platform, thus finally ensuring the safety of operation of an aerial operator.

2. According to the present disclosure, through the arrangement of the first magnetic blocks and the second magnetic blocks, the opposite ends of the first magnetic blocks and the second magnetic blocks are set to be homopolar and repulsive. By the arrangement of the third magnetic blocks and the fourth magnetic blocks, the third magnetic blocks and the fourth magnetic blocks are set to be mutually attractive. In this way, an attractive force is set above the first connecting shaft, and a repulsive force is set below the first connecting shaft. Superposition of the two forces greatly increases a load of the first connecting shaft. At the same time, when the work platform is subjected to an instantaneous pressure, an extremely good buffering effect can be achieved on the instantaneously changed pressure, which greatly improves the stability of the work platform.
3. According to the present disclosure, through the arrangement of the second grooves, the movable plates, the semicircular slots, the springs, and the like, when the load of the work platform changes, the springs can play an extremely good buffering effect on the instantaneously changed pressure, which ensures the stability, well avoids deformation of the transverse waist holes, and greatly reduces the load of the first connecting shaft. Finally, this setting ensures that the entire first connecting shaft is wrapped, so that a stressed area is relatively large and uniform, and deformation is not easy to occur.

Figure 1:
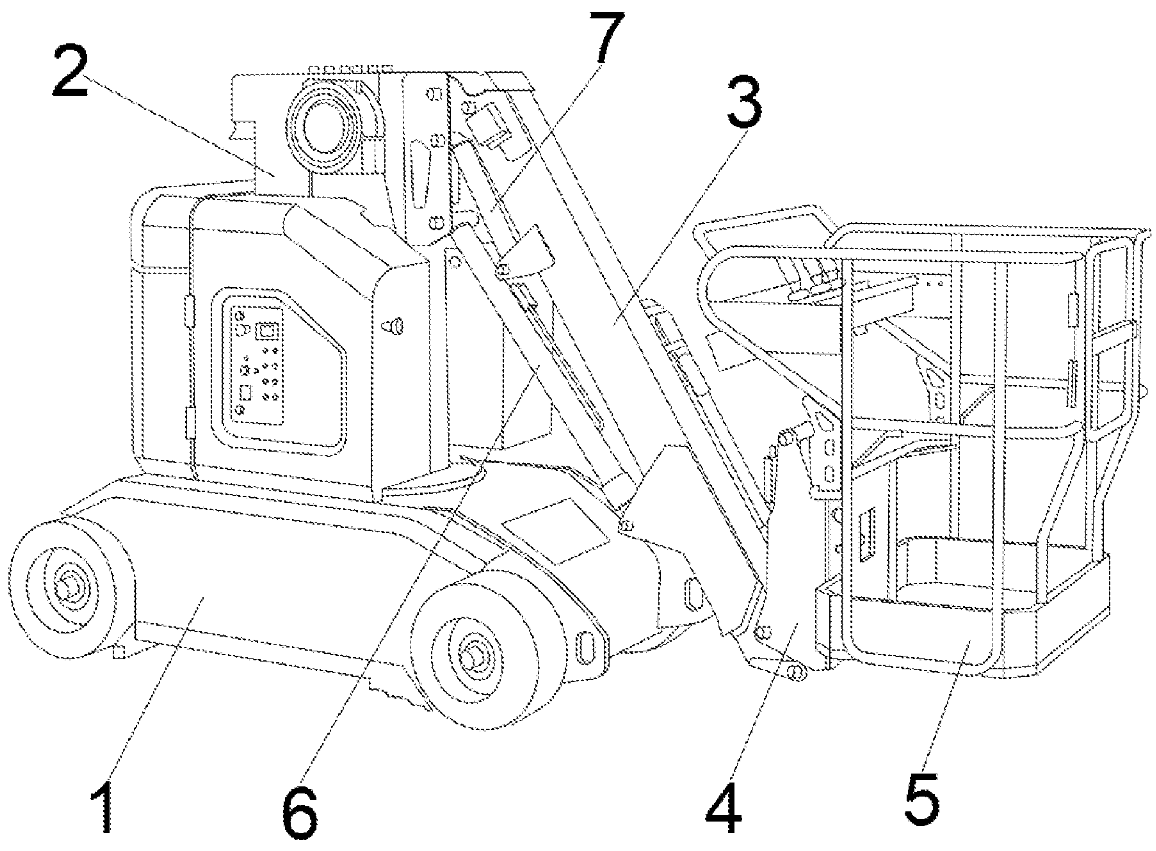
FIG. 1 is an overall schematic diagram of the present disclosure.
Figure 2:
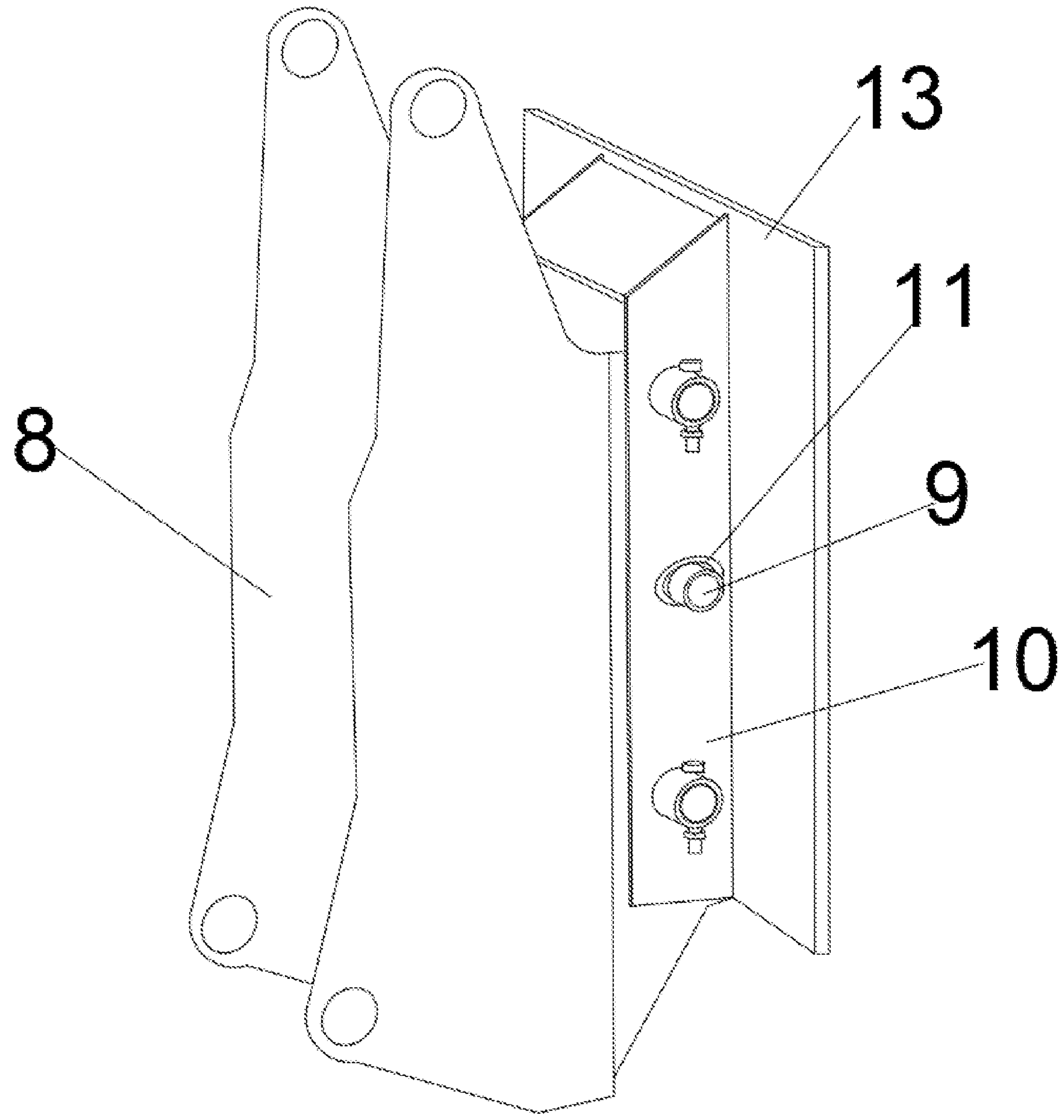
FIG. 2 is a schematic diagram of a connecting structure of the present disclosure.
Figure 3:
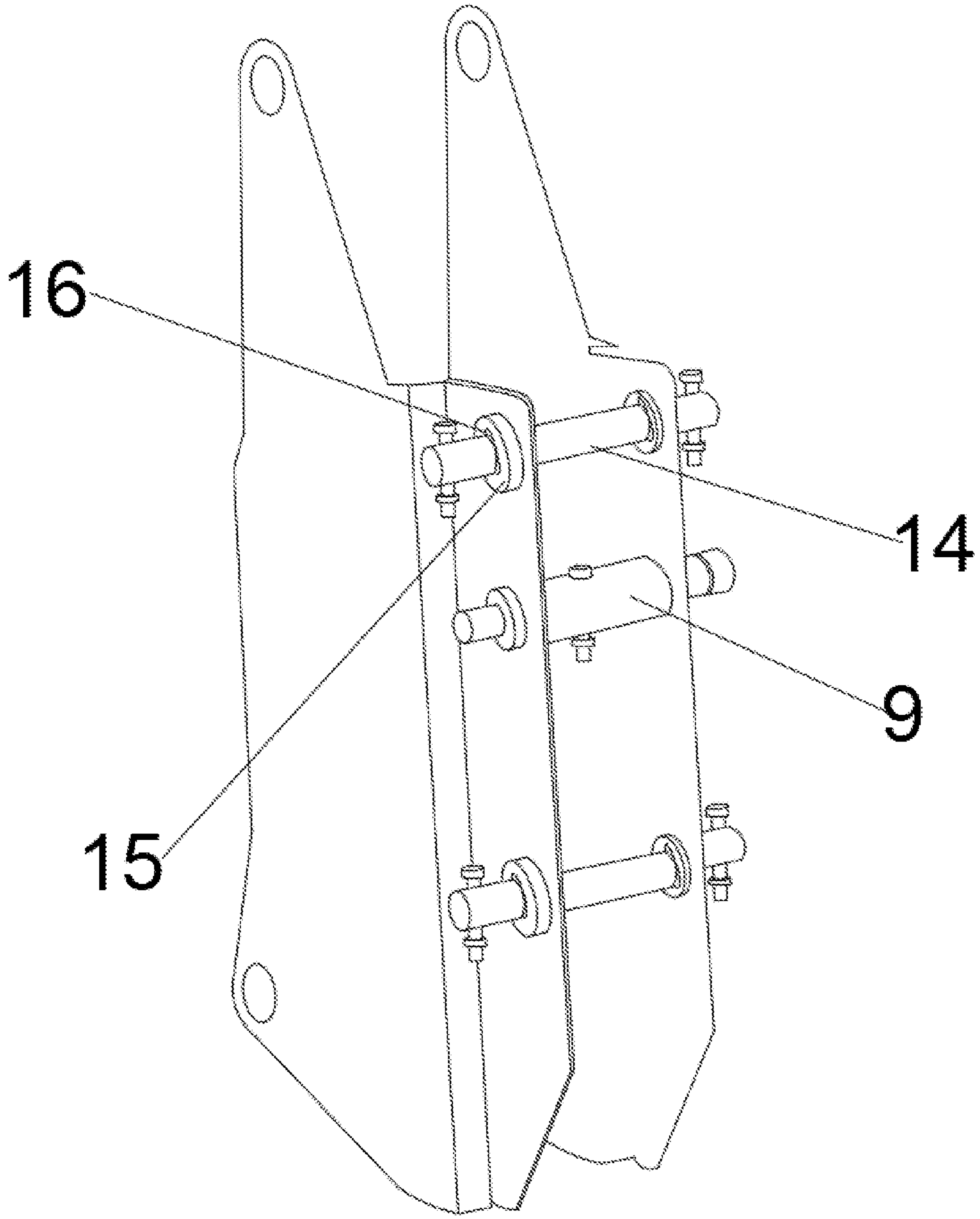
FIG. 3 is a schematic diagram of removing a second connecting plate and a third connecting plate from the connecting structure of FIG. 2 according to the present disclosure.
Figure 4:
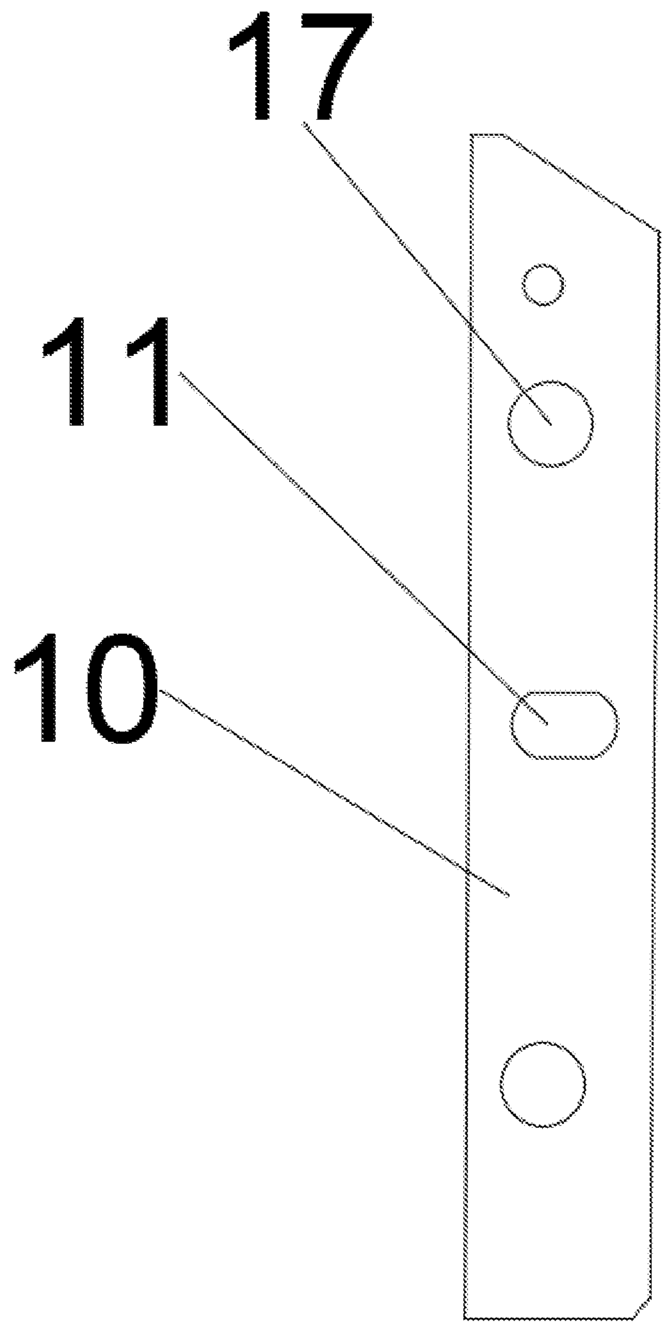
FIG. 4 is an overall schematic diagram of a second connecting plate of the present disclosure.
Figure 5:
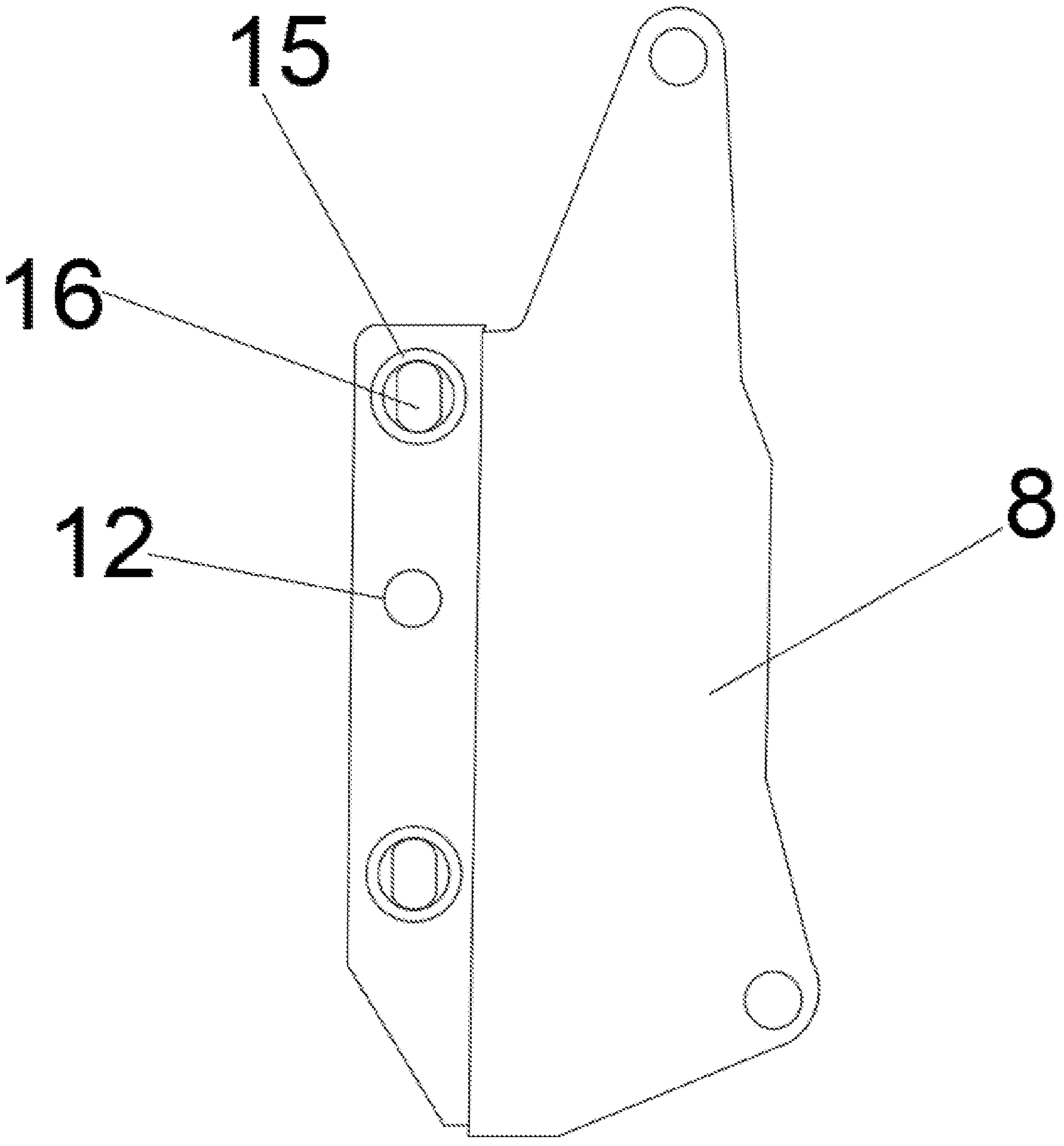
FIG. 5 is an overall schematic diagram of a first connecting plate of the present disclosure.
Figure 6:
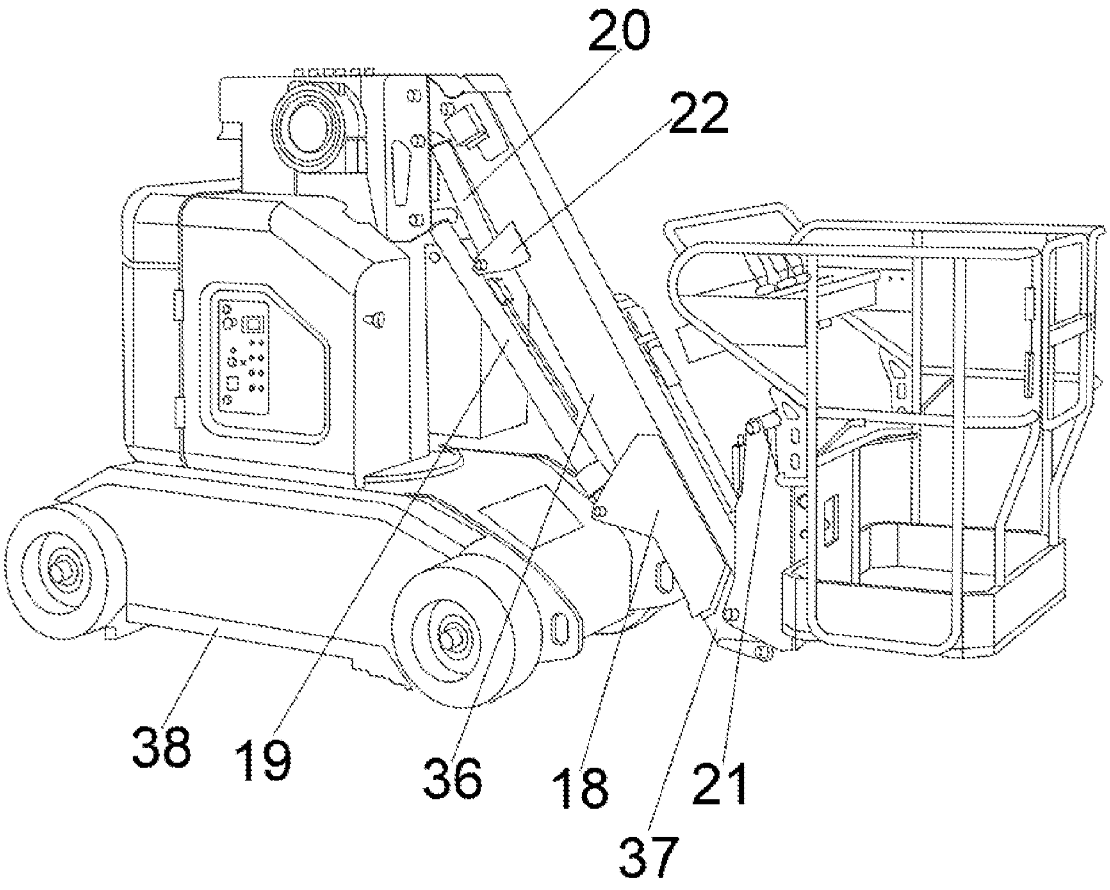
FIG. 6 is an overall schematic diagram of the present disclosure.
Figure 7:
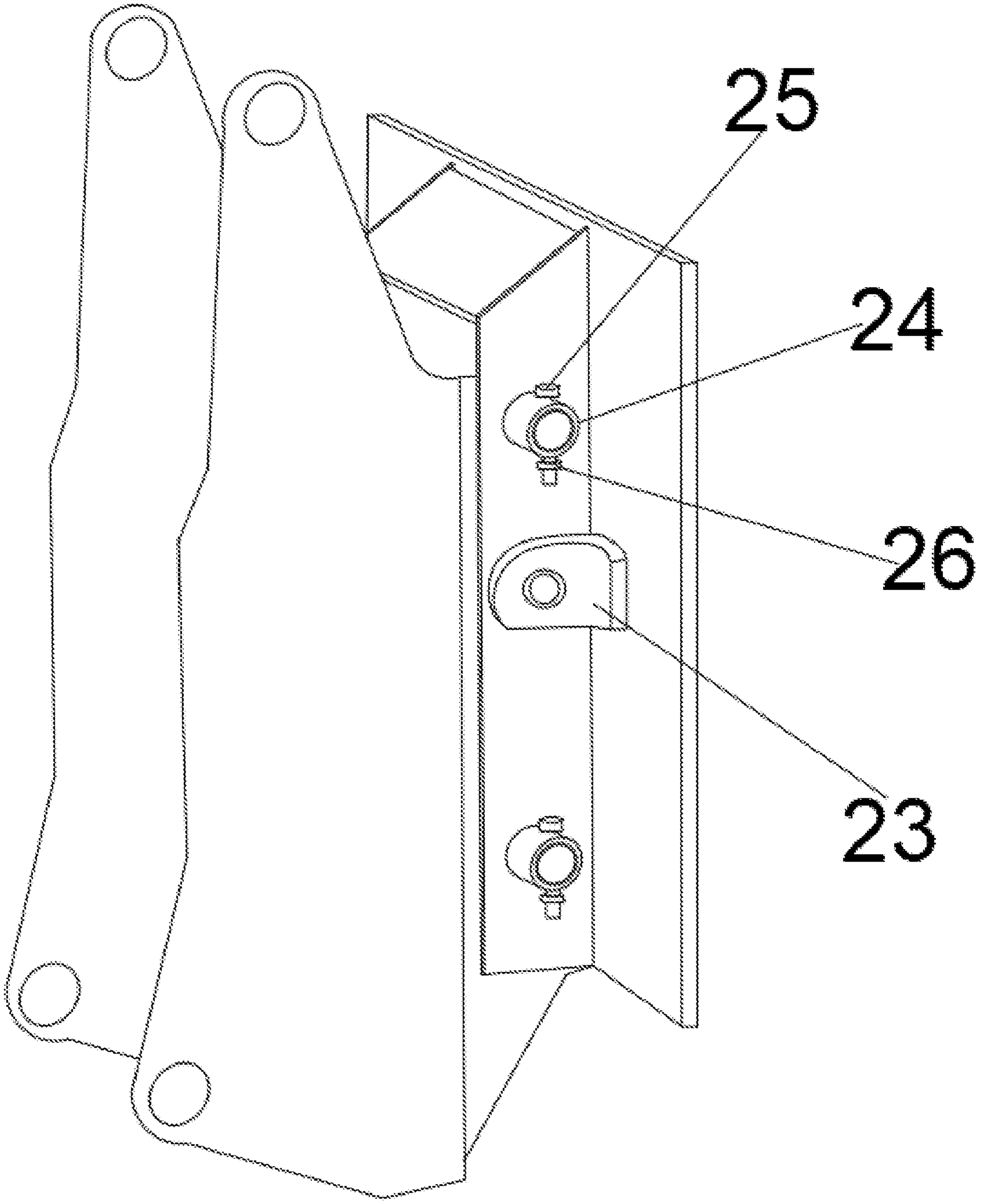
FIG. 7 is a schematic diagram of adding an L-shaped plate to the connecting structure of FIG. 2 according to the present disclosure.
Figure 8:
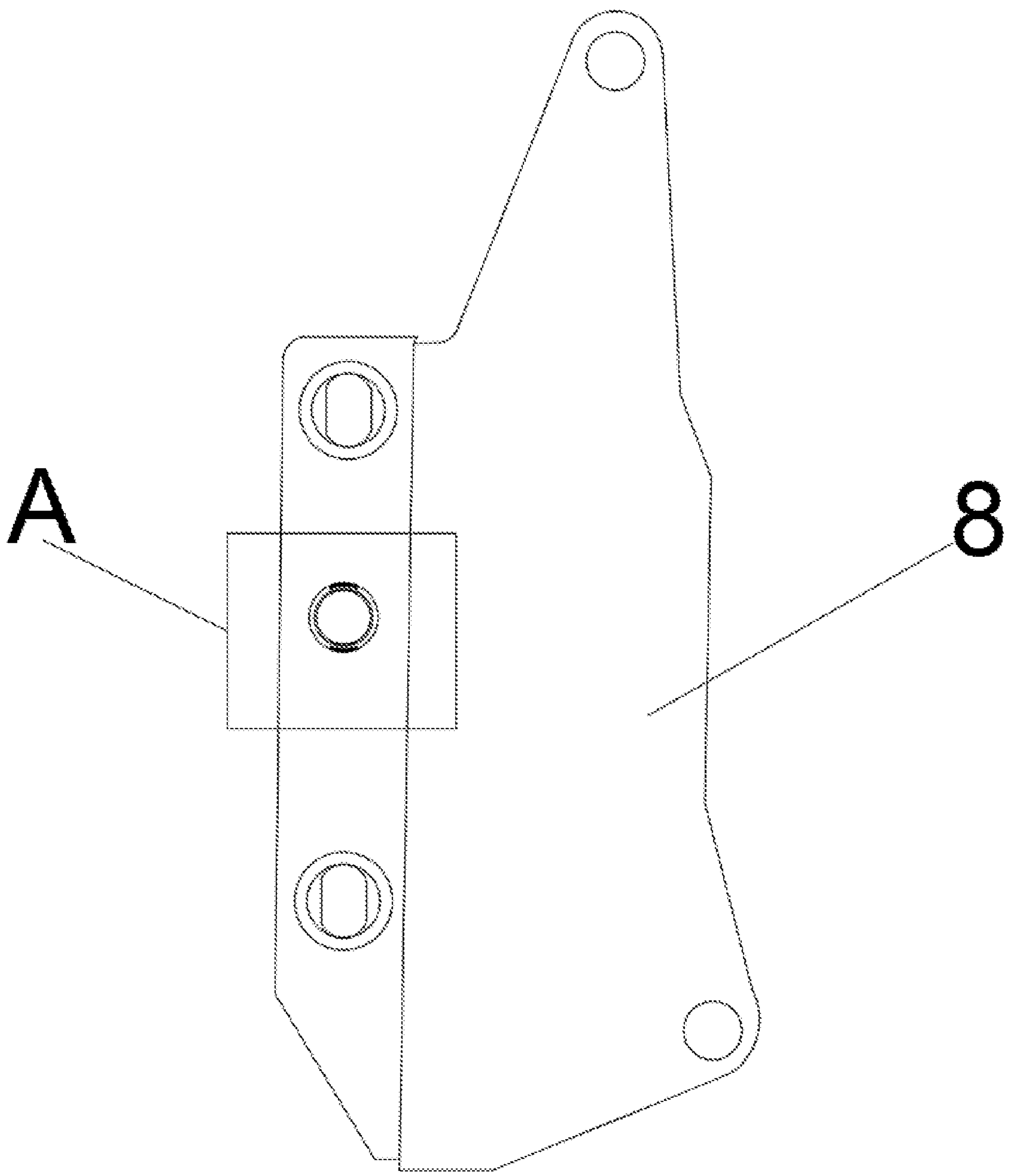
FIG. 8 is an overall schematic diagram of a first connecting plate of the present disclosure.
Figure 9:
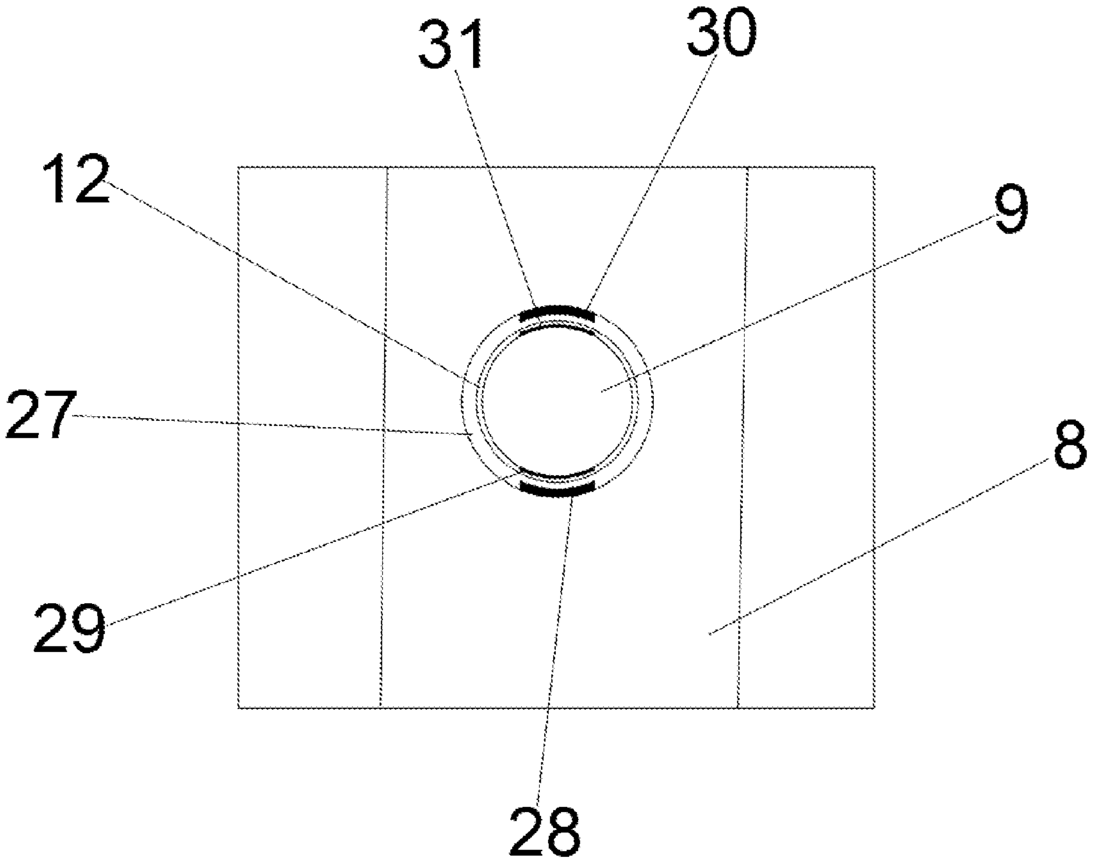
FIG. 9 is a partially enlarged view of A in FIG. 8.
Figure 10:
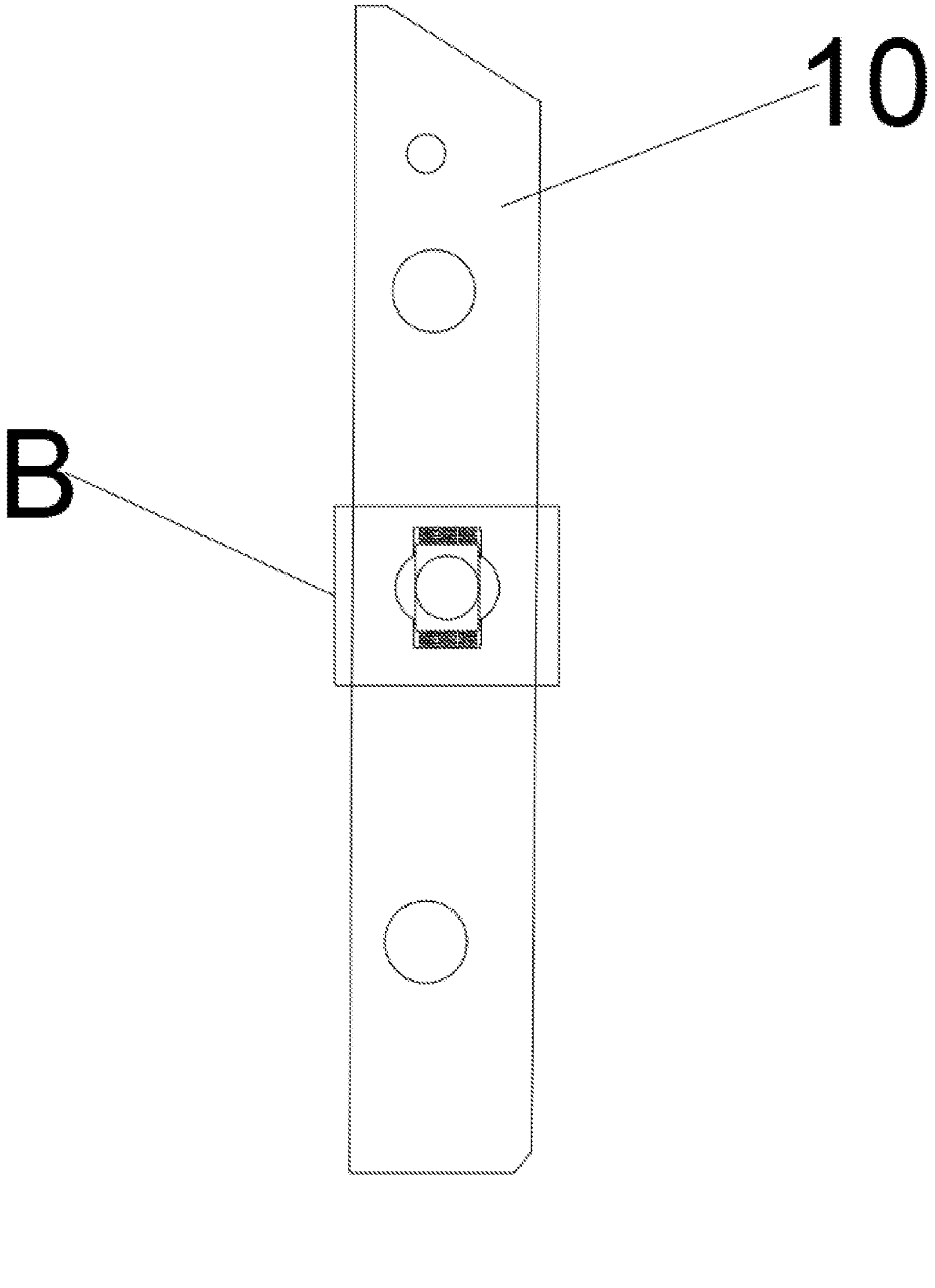
FIG. 10 is an overall schematic diagram of a second connecting plate of the present disclosure.
Figure 11:
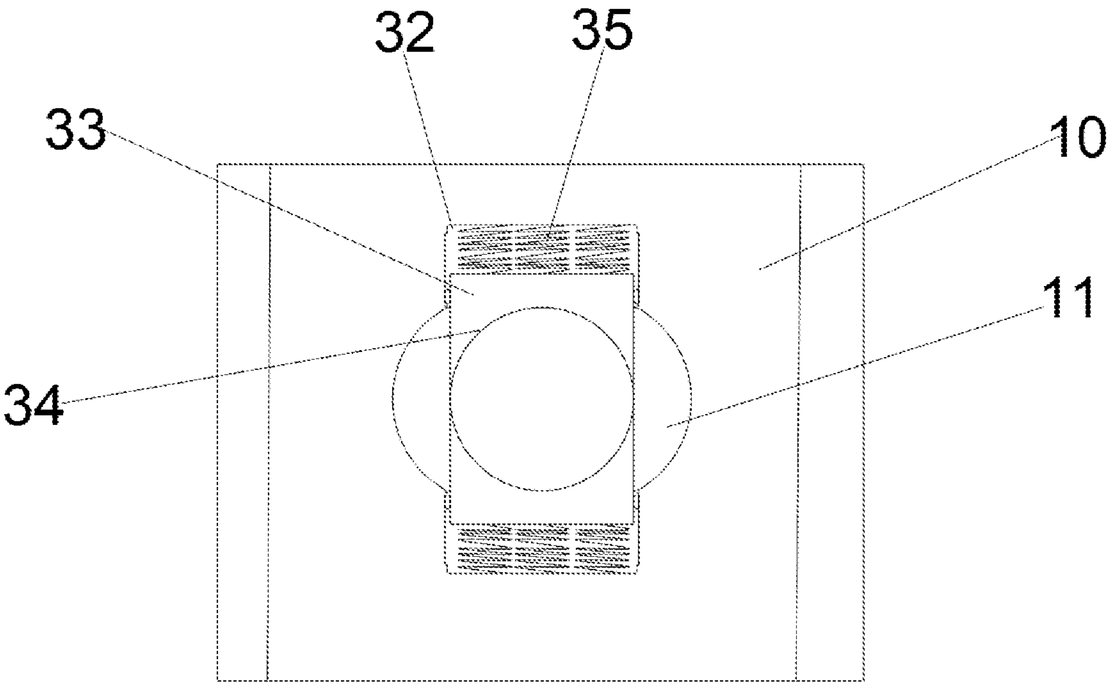
FIG. 11 is a partially enlarged view of B in FIG. 10.

In the drawings: 1: walking base; 2: mast type lifting device; 3: large supporting arm; 4: connecting structure; 5: work platform; 6: up-and-down amplitude changing mechanism; 7: leveling mechanism; 8: first connecting plate; 9: first connecting shaft; 10: second connecting plate; 11: transverse waist hole; 12: first circular hole; 13: third connecting plate; 14: second connecting shaft; 15: shaft sleeve; 16: vertical waist hole; 17: second circular hole; 18: first fixed plate; 19: first oil cylinder; 20: second oil cylinder; 21: third oil cylinder; 22: second fixed plate; 23: L-shaped plate; 24: annular sleeve; 25: screw; 26: nut; 27: first groove; 28: first magnetic block; 29: second magnetic block; 30: third magnetic block; 31: fourth magnetic block; 32: second groove; 33: movable plate; 34: semicircular slot; 35: spring; 36: outer sleeve; 37: inner sleeve; and 38: pit plate structure.

DETAILED DESCRIPTION OF THE EMBODIMENTS

The technical solutions in the embodiments of present disclosure are clearly and completely described below with reference to the accompanying drawings 1 to 11 in the embodiments of present disclosure. Apparently, the described embodiments are merely some rather than all of the embodiments of present disclosure. All other embodiments obtained by a person of ordinary skill in the art based on the embodiments of present disclosure without making creative efforts shall fall within the protection scope of present disclosure.

The present disclosure provides a technical solution: a walking type aerial work platform, including a walking base 1. The walking base 1 is provided with a turntable; a mast type lifting device 2 is fixed on the turntable; the mast type lifting device 2 is hinged with one end of a retractable large supporting arm 3; the other end of the large supporting arm 3 is connected with a work platform 5 through a connecting structure 4; an up-and-down amplitude changing mechanism 6 is arranged between the large supporting arm 3 and the mast type lifting device 2; and a leveling mechanism 7 is arranged among the mast type lifting device 2, the large supporting arm 3, and the connecting structure 4. According to the present disclosure, through the arrangement of the retractable large supporting arm 3 and the up-and-down amplitude changing mechanism 6, when there is an obstacle, the walking type aerial work platform can also transport the work platform 5 to an operation point even if the walking base 1 is not too close to the operation point; transverse and longitudinal distances can be flexibly adjusted; in an adjustment process of the up-and-down amplitude changing mechanism 6, the work platform 5 will tilt. In this case, the work platform 5 is kept in the horizontal state through the leveling mechanism 7, thus ensuring the safety of an operator.

The connecting structure 4 includes two first connecting plates 8 symmetrically arranged. Outer sides of front ends of the two first connecting plates 8 are connected with second connecting plates 10 through a first connecting shaft 9. The second connecting plates 10 are provided with transverse waist holes 11 through which the first connecting shaft 9 passes. The first connecting plates 8 are provided with first circular holes 12 through which the first connecting shaft 9 passes. Front end portions of the two second connecting plates 10 are fixed with a third connecting plate 13; and the work platform 5 is fixed on the third connecting plate 13. The first connecting shaft 9 in the connecting structure 4 of the present disclosure penetrates through the transverse waist holes 11 and the first circular holes 12, wherein heights of the transverse waist holes 11 are equal to a diameter of the first connecting shaft 9. That is, an upper end and a lower end of the first connecting shaft 9 are in contact with upper ends and lower ends of the transverse waist holes 11, and left ends and right ends of the transverse waist holes 11 are in no contact with the first connecting shaft 9. The second connecting plates 10 on the outer sides of the first connecting plates 8, wherein diameters of the first circular holes 12 can be set to be slightly greater than the diameter of the first connecting shaft 9, so that a weight of the work platform fixed on the third connecting plate 13 is borne by the first connecting shaft 9, and the first connecting shaft only bears a force in a vertical direction. The first connecting shaft 9 bears no force in a horizontal direction, so a force in the horizontal direction will not affect the force on the first connecting shaft 9 in the vertical direction. When it is necessary to monitor the weight of the work platform during an operation, only a weighing sensor is mounted on the first connecting shaft 9 to monitor a change in a pressure borne by the first connecting shaft 9 in the vertical direction. It is very convenient, and monitored data is also extremely accurate. Once the monitored data exceeds a preset value, the work platform will be immediately stopped. This ensures the safety of aerial work of an operator.

Several second connecting shafts 14 are also arranged between the two second connecting plates 10. Shaft sleeves 15 through which the second connecting shafts 14 pass are fixed on the first connecting plates 8. Vertical waist holes 16 are formed in the shaft sleeves 15. The second connecting plates 10 are provided with second circular holes 17 through which the second connecting shafts 14 pass. If only the work platform is connected only through the first connecting shaft 9, although the weight can be precisely weighed, the work platform is fixed unstably. Therefore, the work platform is fixed more stably through the second connecting shafts 14. The shaft sleeves 15 are arranged on the first connecting plates 8, and the vertical waist holes 16 are formed in the shaft sleeves 15, wherein diameters of the second connecting shafts 14 are equal to widths of the vertical waist holes 16. That is, the second connecting shafts 14 are in contact with left ends and right ends of the vertical waist holes 16, and are in no contact with upper ends and lower ends of the vertical waist holes 16. Diameters of the second circular holes 17 are slightly greater than the diameters of the second connecting shafts 14. In this way, the work platform can be well fixed by the second connecting shafts 14 through a transverse force, and is more stable. Meanwhile, the second connecting shafts 14 bear no force in the vertical direction, so the precision of weighting of the work platform by the first connecting shaft 9 is not affected. The shaft sleeves 15 are arranged on the second connecting plates 10 instead of the first connecting plates 8, and the diameters of the second circular holes 17 are set to be slightly greater than the diameters of the second connecting shafts 14, which further ensures the precision of weighing. As the force on the work platform in the horizontal direction changes, the force is borne by the second connecting shafts 14, and the shaft sleeves 15 are arranged on the first connecting plates 8. This force will act on the first connecting plates 8 and not affect the second connecting plates 10. If the shaft sleeves 15 are arranged on the second connecting plates 10, the second connecting plates 10 will be affected, which will, to some extent, affect the precision of weighing of the first connecting shaft 9. Therefore, this setting ensures the precision of weighing and thus ensures the safety of operation of an aerial worker.

The up-and-down amplitude changing mechanism 6 includes two first fixed plates 18 fixed on front and rear sides close to a lower end of the large supporting arm; one end of a first oil cylinder 19 is hinged between the two first fixed plates 18; and the other end of the first oil cylinder 19 is hinged to the mast type lifting device 2. Up-and-down amplitude changing of the large supporting arm 3 is achieved through the first oil cylinder 19.

The leveling mechanism 7 includes a second oil cylinder 20 and a third oil cylinder 21. The second oil cylinder 20 and the third oil cylinder 21 are communicated with each other, wherein one end of the second oil cylinder 20 is hinged to the mast type lifting device 2, and the other end of the second oil cylinder is hinged to two second fixed plates 22. The two second fixed plates 22 are respectively fixed on front and rear sides of the large supporting arm 3. One end of the third oil cylinder 21 is hinged to an upper end of the connecting structure 4; and the other end of the third oil cylinder is hinged to a bottom end of the large supporting arm 3. Due to passive extension of the second oil cylinder 20 in an extension process of the first oil cylinder 19, and the communication between the second oil cylinder 20 and the third oil cylinder 21, oil discharged by the extension of the second oil cylinder 20 exactly enters the third oil cylinder 21, so that the third oil cylinder 21 extends by the same amount to keep the work platform 5 in a horizontal state. An upper end of the third oil cylinder 21 is hinged to upper ends of the two first connecting plates 8, and a lower end of the third oil cylinder 21 is hinged to a lower end of the large supporting arm 3. The large supporting arm 3 is arranged to be an extension sleeve type, including an outer sleeve 36 and an inner sleeve 37. The outer sleeve 36 is shorter than the inner sleeve 37, and the third oil cylinder 21 is hinged to a lower end of the inner sleeve 37. By this setting, the work platform 5 can be leveled while an amplitude of the large supporting arm 3 changes, which not only achieves high leveling efficiency, but also greatly saves the costs.

Two end portions of the first connecting shaft 9 extend out of the second connecting plates 10. The two end portions of the first connecting shaft 9 are fixedly connected to the third connecting plate 13 through L-shaped plates 23. A weighing sensor is arranged at one of the end portions of the first connecting shaft 9. The first connecting shaft 9 is well fixed through the L-shaped plates 23. The weighing sensor is arranged at the end portion of the first connecting shaft 9. This facilitates the mounting and achieves the precise weighing.

Two end portions of the second connecting shafts 14 extend out of the second connecting plates 10, and the two end portions of the second connecting shafts 14 are sleeved with annular sleeves 24. One end of each annular sleeve 24 is fixedly connected to the second connecting plate 10. The annular sleeves 24 and the second connecting shafts 14 are fixed together through screws 25 and nuts 26. The diameters of the second circular holes 17 are set to be slightly greater than the diameters of the second connecting shafts 14. The second connecting shafts 14 need to be arranged at center positions of the second circular holes 17, so that the second connecting shafts 14 can only be fixed in the above manner.

Edges of the first circular holes 12 are outwards provided with first grooves 27. First magnetic blocks 28 are fixed at lower ends of the first grooves 27. Second magnetic blocks 29 are fixed at positions, opposite to the first magnetic blocks 28, on the first connecting shaft 9. The first magnetic blocks 28 and the second magnetic blocks 29 are mutually repulsive. Third magnetic blocks 30 are fixed at upper ends of the first grooves 27. Fourth magnetic blocks 31 are fixed at positions, opposite to the third magnetic blocks 30, on the first connecting shaft 9. The third magnetic blocks 30 and the fourth magnetic blocks 31 are mutually attractive. Through the arrangement of the first magnetic blocks 28 and the second magnetic blocks 29, the opposite ends of the first magnetic blocks and the second magnetic blocks are set to be homopolar and repulsive. In this way, the first magnetic blocks 28 may generate a repulsive force on the first connecting shaft 9. This force can be set according to a requirement. If a high repulsive force is required, the first magnetic blocks 28 and the second magnetic blocks 29 are set to be ferromagnetic. In this way, there is always a supporting force on the first connecting shaft 9, which increases a load of the first connecting shaft 9, thus finally increasing a load of the work platform. Through the arrangement of the third magnetic blocks 30 and the fourth magnetic blocks 31, the third magnetic blocks and the fourth magnetic blocks are set to be mutually attractive. In this way, the third magnetic blocks 30 may always generate an upward attractive force on the first connecting shaft 9, which further increases the load of the first connecting shaft 9. In this way, an attractive force is set above the first connecting shaft 9, and a repulsive force is set below the first connecting shaft 9. Superposition of the two forces greatly increases the load of the first connecting shaft 9. At the same time, when the work platform is subjected to an instantaneous pressure, an extremely good buffering effect can be achieved on the instantaneously changed pressure, which greatly improves the stability of the work platform.

Upper and lower edges of the transverse waist holes 11 are outwards provided with second grooves 32. Movable plates 33 are arranged in the second grooves 32. Semicircular slots 34 are arranged at inner ends of the movable plates 33. The movable plates 33 are slidably connected to the second grooves 32. Several springs 35 are connected between bottom surfaces of the second grooves 32 and the movable plates 33. The upper and lower semicircular slots 34 precisely form a circular cavity. A diameter of the circular cavity is exactly equal to the diameter of the first connecting shaft 9. The first connecting shaft 9 is sleeved in the cavity. When the load of the work platform changes, the springs 35 can achieve the extremely good buffering effect on the instantaneously changed pressure. On the one hand, the stability is ensured, and on the other hand, deformation of the transverse waist holes 11 is well avoided. Without this structure, when the load of the work platform changes, it directly affects the upper and lower ends of the horizontal waist holes 11. This can easily cause damage to the upper and lower edges of the horizontal waist holes 11, causing the horizontal waist holes to deform. Once the horizontal waist holes deform, it will affect the steadiness and levelness of the work platform, posing a great potential safety hazard. By the arrangement of this structure, this problem has been effectively solved. In addition, since the end portions of the first connecting shaft 9 are fixed, there will be a downward force on the first connecting shaft 9 when the load on the work platform increases. Since the first connecting shaft 9 is fixed, the pressure on the first connecting shaft may be transmitted to the movable plates 33 below. After being pressed, the movable plates 33 below may quickly move downwards, and the movable plates 33 below may be momentarily separated from the first connecting shaft 9. Afterwards, due to the action of the springs 35, the movable plates 33 below may be instantly rebounded to apply an upward impact force on the first connecting shaft 9. The upward impact force greatly reduces the load of the first connecting shaft 9. Finally, in this setting, the entire first connecting shaft 9 is wrapped, so that a stressed area is relatively large and uniform. If there are only the transverse waist holes 11, a place where the first connecting shaft 9 is in contact with each transverse waist hole 11 is nearly a point, so that deformation easily occurs once a high pressure is applied.

A pit plate structure 38 is arranged at a bottom of the walking base 1. This structure can timely stabilize a vehicle body and prevent tipping when wheels of a vehicle fall into pits or other recesses during driving.

The working principle is as follows: When aerial work is required, the walking type aerial work platform is first driven to be near a place for operation through the walking base 1. Afterwards, an operator enters the work platform 5 and then adjusts a position of the work platform 5 until the work platform 5 is transported to an aerial place for operation. During the adjustment, a height of the work platform 5 can be adjusted through the mast type lifting device 2. When the mast type lifting device 2 transports the work platform 5 to a similar height, positions of the work platform 5 in the horizontal and vertical directions are accurately adjusted through the retractable large supporting arm 3 and the first oil cylinder 19. Due to passive extension of the second oil cylinder 20 in an extension process of the first oil cylinder 19, and the communication between the second oil cylinder 20 and the third oil cylinder 21, oil discharged by the extension of the second oil cylinder 20 exactly enters the third oil cylinder 21, so that the third oil cylinder 21 extends by the same amount to keep the work platform 5 in a horizontal state. The connecting structure 4 can precisely monitor the load of the work platform 5 throughout the process. Once it is monitored that a pressure exceeds a preset threshold, the work platform will be stopped immediately to ensure the safety of the operator.

Although the embodiments of the present disclosure have been shown and described, it can be understood by those of ordinary skill in the art that various changes, modifications, substitutions, and variations can be made to these embodiments without departing from the principle and spirit of the present disclosure. The scope of the present disclosure is defined by the accompanying claims and their equivalents.

What is claimed is:

1. A walking aerial work platform, comprising a walking base (1), wherein the walking base (1) is provided with a turntable; a lifting device (2) is fixed on the turntable; the lifting device (2) is hinged with one end of a retractable supporting arm (3); the other end of the supporting arm (3) is connected with a work platform (5) through a connecting structure (4); an up-and-down amplitude changing mechanism (6) is arranged between the supporting arm (3) and the lifting device (2); and a leveling mechanism (7) is arranged among the lifting device (2), the supporting arm (3), and the connecting structure (4);

wherein the connecting structure (4) comprises two first connecting plates (8) symmetrically arranged; outer sides of front ends of the two first connecting plates (8) are connected with second connecting plates (10) through a first connecting shaft (9);

the second connecting plates (10) are provided with transverse waist holes (11) through which the first connecting shaft (9) passes; the first connecting plates (8) are provided with first circular holes (12) through which the first connecting shaft (9) passes; front end portions of the two second connecting plates (10) are fixed with a third connecting plate (13); and the work platform (5) is fixed on the third connecting plate (13).

2. The walking type aerial work platform according to claim 1, wherein several second connecting shafts (14) are also arranged between the two second connecting plates (10); shaft sleeves (15) through which the second connecting shafts (14) pass are fixed on the first connecting plates (8); vertical waist holes (16) are formed in the shaft sleeves (15); and the second connecting plates (10) are provided with second circular holes (17) through which the second connecting shafts (14) pass.

3. The walking aerial work platform according to claim 2, wherein two end portions of the second connecting shafts (14) extend out of the second connecting plates (10); the two end portions of the second connecting shafts (14) are sleeved with annular sleeves (24); one end of each annular sleeve (24) is fixedly connected to the second connecting plate (10); and the annular sleeves (24) and the second connecting shafts (14) are fixed together through screws (25) and nuts (26).

4. The walking aerial work platform according to claim 1, wherein the up-and-down amplitude changing mechanism (6) comprises two first fixed plates (18) fixed on front and rear sides adjacent to a lower end of the supporting arm (3); one end of a first oil cylinder (19) is hinged between the two first fixed plates (18); and the other end of the first oil cylinder (19) is hinged to the lifting device (2).

5. The walking aerial work platform according to claim 4, wherein the leveling mechanism (7) comprises a second oil cylinder (20) and a third oil cylinder (21); the second oil cylinder (20) and the third oil cylinder (21) are communicated with each other, wherein one end of the second oil cylinder (20) is hinged to the lifting device (2), and the other end of the second oil cylinder is hinged to two second fixed plates (22); the two second fixed plates (22) are respectively fixed on front and rear sides of the supporting arm (3); one end of the third oil cylinder (21) is hinged to an upper end of the connecting structure (4);

and the other end of the third oil cylinder (21) is hinged to a bottom end of the supporting arm (3).

6. The walking aerial work platform according to claim 1, wherein two end portions of the first connecting shaft (9) extend out of the second connecting plates (10); the two end portions of the first connecting shaft (9) are fixedly connected to the third connecting plate (13) through L-shaped plates (23); and a weighing sensor is arranged at one of the end portions of the first connecting shaft (9).

7. The walking aerial work platform according to claim 1, wherein edges of the first circular holes (12) are outwards provided with first grooves (27); first magnetic blocks (28) are fixed at lower ends of the first grooves (27); second magnetic blocks (29) are fixed at positions, opposite to the first magnetic blocks (28), on the first connecting shaft (9); the first magnetic blocks (28) and the second magnetic blocks (29) are mutually repulsive; third magnetic blocks (30) are fixed at upper ends of the first grooves (27); fourth magnetic blocks (31) are fixed at positions, opposite to the third magnetic blocks (30), on the first connecting shaft (9); and the third magnetic blocks (30) and the fourth magnetic blocks (31) are mutually attractive.

8. The walking aerial work platform according to claim 1, wherein upper and lower edges of the transverse waist holes (11) are outwards provided with second grooves (32); movable plates (33) are arranged in the second grooves (32); semicircular slots (34) are arranged at inner ends of the movable plates (33); the movable plates (33) are slidably connected to the second grooves (32);

and several springs (35) are connected between bottom surfaces of the second grooves (32) and the movable plates (33).

9. The walking aerial work platform according to claim 1, wherein a pit plate structure (38) is arranged at a bottom of the walking base (1).

* * * * *